United States Patent [19]

Otto

[11] Patent Number: 5,707,222
[45] Date of Patent: Jan. 13, 1998

[54] VACUUM PUMP WITH RESILIENT DRIVE

[75] Inventor: Dieter Otto, Ennepetal, Germany

[73] Assignee: LuK Automobiltechnik GmbH & Co., KG, Germany

[21] Appl. No.: 653,540

[22] Filed: May 28, 1996

[30] Foreign Application Priority Data

May 31, 1995 [DE] Germany .................. 195 19 841.7

[51] Int. Cl.⁶ ...................... F04C 18/344; F04C 29/00
[52] U.S. Cl. .................. 418/255; 418/259; 418/270; 464/101
[58] Field of Search .................. 418/69, 255, 259, 418/270; 464/100, 101

[56] References Cited

U.S. PATENT DOCUMENTS

| | | | |
|---|---|---|---|
| 2,243,900 | 6/1941 | Fulcher | 464/100 |
| 2,897,662 | 8/1959 | Gondek | 464/100 |
| 3,016,723 | 1/1962 | Gondek | 464/100 |
| 4,944,279 | 7/1990 | Woodard | 418/206.1 |
| 4,953,517 | 9/1990 | McGovern et al. | 464/100 |

Primary Examiner—John J. Vrablik
Attorney, Agent, or Firm—Ostrolenk, Faber, Gerb & Soffen, LLP

[57] ABSTRACT

A vacuum pump, particularly adapted for use with a power assisted brake system of a motor vehicle, includes a pump housing with a small diameter section and a larger section. A rotor in the housing with a smaller diameter coupling section and with a larger diameter pump section in the larger section of the housing. A rotor wing in the larger section of the housing is received in a slot in the rotor for being rotated by the rotor. A drive element passing along the axis of the rotor is connectable with a coupling to drive the drive element and is positioned between the two half bodies of the rotor for rotating the rotor and the wing of the rotor. The drive element has a coupling section of elastic resilient material which is received in a slot in the rotor and has wing sections above and below the plane of the coupling section which define a slot in the rotor in which the rotor wing is received, such that the drive element can absorb torque and oscillations.

58 Claims, 3 Drawing Sheets 5,707,222

VACUUM PUMP WITH RESILIENT DRIVE

BACKGROUND OF THE INVENTION

The present invention relates to a vacuum pump, in particular for use with power assisted brake systems of motor vehicles and particularly relates to the drive element between a coupling to the pump and the rotor in the pump. A pump of this general type is disclosed in U.S. Pat. No. 4,604,041.

Vacuum pumps of the type disclosed here have a rotor which is driven by the internal combustion engine of the vehicle via a coupling connected to the rotor by a drive element. On the end of the drive element opposite the coupling, the rotor is in engagement with a vane or wing which can be placed in rotation within a pump housing by the drive element rotating the rotor. It has been found that the rotor is subjected to high mechanical stresses because strong rotational oscillations coming from the drive are transmitted to the rotor via the coupling. The necessary clearances in the connection between the drive shaft and the coupling and between the coupling and the rotor even increase the acceleration of the angle of rotation of the drive shaft. This frequently leads to the rotor breaking or makes it necessary to use high strength material, which is difficult and expensive to machine.

SUMMARY OF THE INVENTION

The object of the present invention is therefore to create a vacuum pump of the aforementioned type which does not have these disadvantages and which absorbs and damps high mechanical stresses and oscillations.

This object is achieved in a vacuum pump which has a rotor which drives a vane or wing. An elastic drive element connects a coupling from a motor to the rotor wing. The vacuum pump is particularly adapted for use with a power assisted brake system of a motor vehicle. The pump includes a pump housing which has a smaller diameter section and a larger section. A rotor in the housing has a smaller diameter coupling section and a larger diameter pump section in the larger section of the housing. The rotor wing in the larger section of the housing is received in a slot in the rotor for being rotated by the rotor.

A drive element passes along the axis of the rotor and is connectable with a coupling which drives the drive element. The drive element is positioned between the two half bodies of the rotor for rotating the rotor and the wing received in the rotor. The drive element has a coupling section of elastic, resilient material which is received in a slot in rotor wing sections located above and below the plane of the coupling section and the wing sections define a slot in the rotor in which the wing of the rotor is received. The design of the drive element enables it to absorb torque and oscillations. Because the rotor of the vacuum pump has a resilient drive element which cooperates with the coupling, torque peaks which occur upon engagement of the coupling as well as rotational oscillations are effectively damped, so that a breakdown of the rotor is avoided with a high degree of certainty.

In a preferred embodiment of the vacuum pump, the rotor has an elongated drive element which extends from the region of engagement of the coupling up to the wing in the rotor. The moment of rotation of the coupling is therefore conducted by the drive element up to that wing. Peak stresses, which are also produced also by rotational oscillations are effectively damped.

In the preferred embodiment of the vacuum pump, the drive element is developed in one piece, since in that case, its cost of manufacture is relatively slight and disturbances in its operation are reduced to a minimum in view of its simple construction.

Further in the preferred embodiment, the drive element has a coupling section prior to the wing engaging section, which varies in width over the length along the drive element axis. This makes it possible to adapt the elasticity, or more generally the damping properties, of the drive element to the operating conditions of different vacuum pumps.

In particular, the preferred embodiment of the vacuum pump includes a rotor which has a drive element which has a wing section with two wing regions which are arranged parallel to and spaced from each other so that the wing of the vacuum pump rotor can be arranged between these wing regions of the drive element. This assures that torque acting on the drive element is actually transmitted to the rotor wing.

Finally, in the preferred embodiment, the vacuum pump rotor is comprised of two identically developed half bodies and the drive element is arranged in the parting region between the half bodies. The drive forces are taken up directly by the half bodies of the rotor and are introduced into the rotor, producing a very stable construction. The rotor dependably supports the drive element within the vacuum pump. In this case, manufacture of the rotor is very simple and it can therefore be effected at favorable cost.

Other features and advantages of the present invention will become apparent from the following description of the invention which refers to the accompanying drawings.

DETAILED DESCRIPTION OF THE INVENTION

Figure 1:
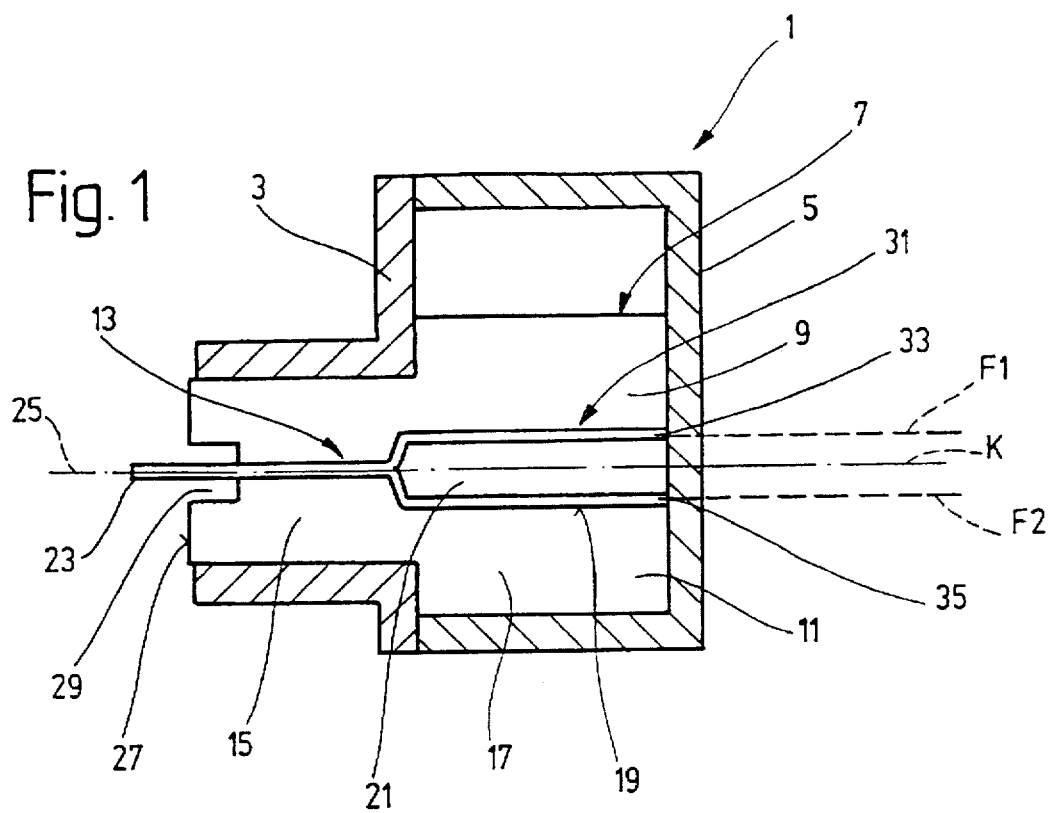
FIG. 1 is a diagrammatic side view of a vacuum pump, shown in a partial section.

The vacuum pump 1 shown in FIG. 1 includes a flange 3 with a housing 5 fastened on it. A rotor 7 within the vacuum pump 1 is developed in several parts. It has two identically half bodies 9 and 11. The outer surface of the rotor 7 is cylindrical. The half bodies 9 and 11 enclose a drive element 13 in their parting region, which lies in the plane of symmetry of the rotor 7.

A first section 15 of the rotor 7 lies within the enclosed area defined within flange 3 and is supported there in suitable manner. A second section 17 of the rotor 7 has a larger outside diameter and is arranged within the housing 5. The inner diameter of the housing 5 is greater than that of the second section 17.

The second section 17 is provided with a continuous slot 19 which is arranged in the region of the parting plane of the half bodies 9 and 11. That slot receives a rotor vane or wing 21 having a length which is greater than the diameter of the second section 17. The wing 21 is displaceable in radial directions within the slot 19. It is guided by the rotor 7. The center of the rotor is located outside of or eccentric to the center of the housing 5, and the resulting substantially elliptical inner space of the housing 5 is subdivided into two sections, which serve to produce a vacuum. The housing has an inlet to its larger open area and an outlet from its smaller open area containing the rotor. Vacuum pumps of the type in question are known, generally, as in U.S. Pat. No. 4,604,041, incorporated herein, particularly for pump construction details, so that their operation and construction need not be discussed further.

The drive element 13 has a coupling section 23 which is arranged inside the region of the housing flange 3. The section 23 is arranged in a plane K in which the axis of rotation 25 of the rotor 7 also extends.

The coupling section 23 protrudes beyond the coupling side end surface 27 of the rotor 7. The half bodies 9 and 11 are so developed that close to the end surface 27, a slot recess 29 is formed which extends in the diametral direction of the rotor 7, in this case in the direction of the plane K or of the parting plane of the half bodies 9 and 11. The depth of the slot recess 29, as measured from the end surface 27, can be varied. This changes the length of the unclamped, free to be deformed coupling section 23. This enables the spring properties of the drive element 13 to be adapted to different types of vacuum pumps 1, as discussed further below.

The drive element 13 has a wing section 31 which has two vertically separated wing regions 33 and 35. The wing regions are arranged in respective planes F1 and F2 which are spaced apart and parallel to each other. The plane K preferably forms the plane of symmetry or center plane between the planes F1 and F2.

Figure 2:
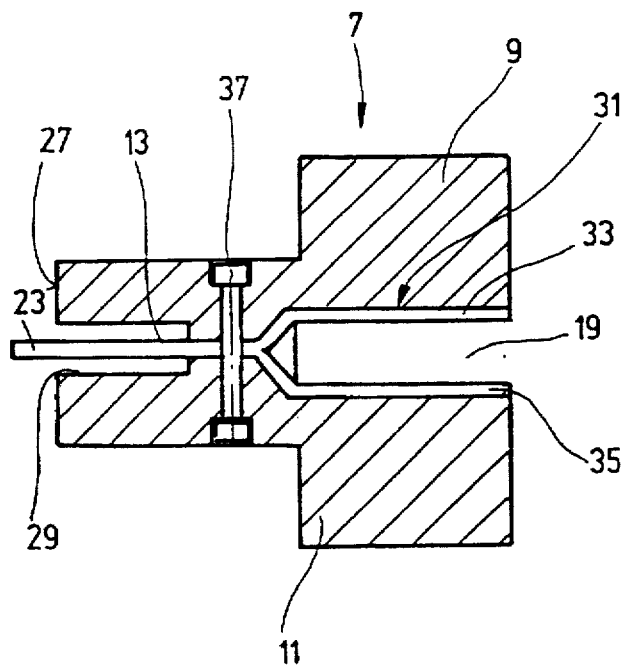
FIG. 2 is a longitudinal section through the rotor of a vacuum pump.
Figure 3:
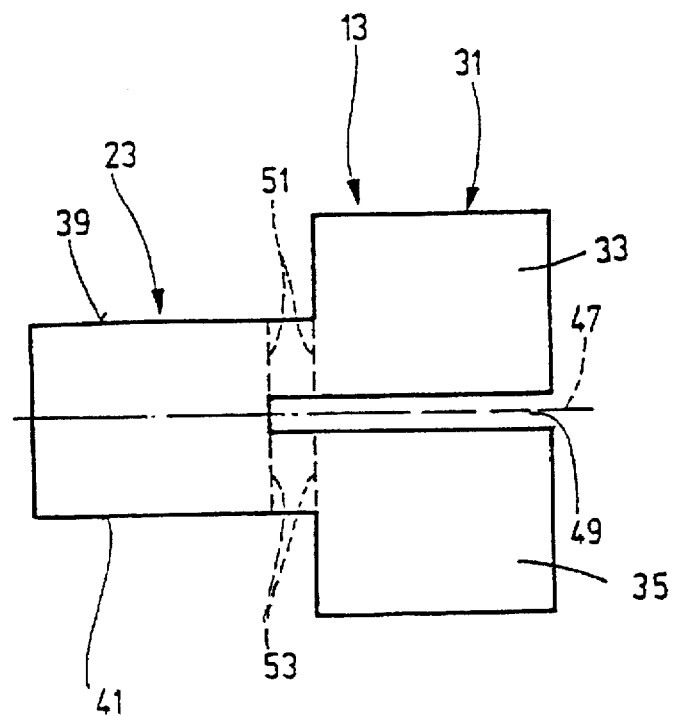
FIG. 3 is a top view of a drive element of a vacuum pump in accordance with FIG. 1.

FIGS. 1-3, show that the drive element 13 is developed in one piece and extends over the entire length of the rotor 7. It may be of one piece and of a resilient metal stamping. In particular, the wing regions 33 and 35 of the drive element form, at least in regions thereof, opposite side surfaces of the slot 19. Here, the wing regions 33 and 35 are arranged on the side surfaces of the slot 19 which are opposite each other. They lie against the side surfaces of the rotor wing 21 so that torque exerted on the coupling section 23 is transmitted directly to the wing 21.

A coupling which cooperates with the vacuum pump 1 acts on the free end of the coupling section 23 and thus places the rotor 7 in rotation. As a result, the wing 21 also turns within the housing 5 and a vacuum is produced in the pump housing in a known manner.

The construction of the rotor 7 is explained with reference to the longitudinal section shown in FIG. 2. Identical parts have been provided with the same reference numerals so reference may be had to the description of FIG. 1.

The drive element 13 is located between the two identical half bodies 9 and 11 of the rotor 7. The coupling section 23 of the element 13 extends beyond the end surface 27 of the rotor 7 and is arranged in a slot recess 29. Torque introduced into the coupling section 23 can lead to a twisting in the free standing or unclamped region of the coupling section 23, since the drive element 13 is comprised of an elastic, resilient material. Torque introduced into the coupling section 23 is transmitted to the rotor 7 since the drive element 13 is firmly clamped between the half bodies 9 and 11, which are connected to each other, for instance, by a bolt 37 which passes through the drive element 13.

FIG. 2 shows that the drive element 13 is developed in a single piece and extends over the entire length of the rotor 7 and, in particular, is arranged also on the side surfaces of the slot 19. For this purpose, the wing section 31 is divided into two wing regions, 33 at the top and 35 at the bottom in FIG. 2.

The rotor 7 or each half body 9, 11 can be comprised of plastic, metal, or a sintered material. It is essential that the drive forces exerted by a coupling (not shown here) on the rotor 7 be taken up by the drive element 13 or particularly its coupling section 23 and be transmitted to the wing 21 against which the wing regions 33 and 35 of the wing section 31 rest. The half bodies 9 and 11 of the rotor 7 support and mount the drive element 13 which, however, intercepts substantial amounts of the drive forces so that the requirements as to strength of the rotor 7 can be clearly reduced. Furthermore, the half bodies 9 and 11 assume sealing functions within the pump. This makes a pump function possible but places no particular demands as to strength on the half bodies. Thus, inexpensive structural parts (selection of material, manufacturing methods) can be used here.

Figure 3A:
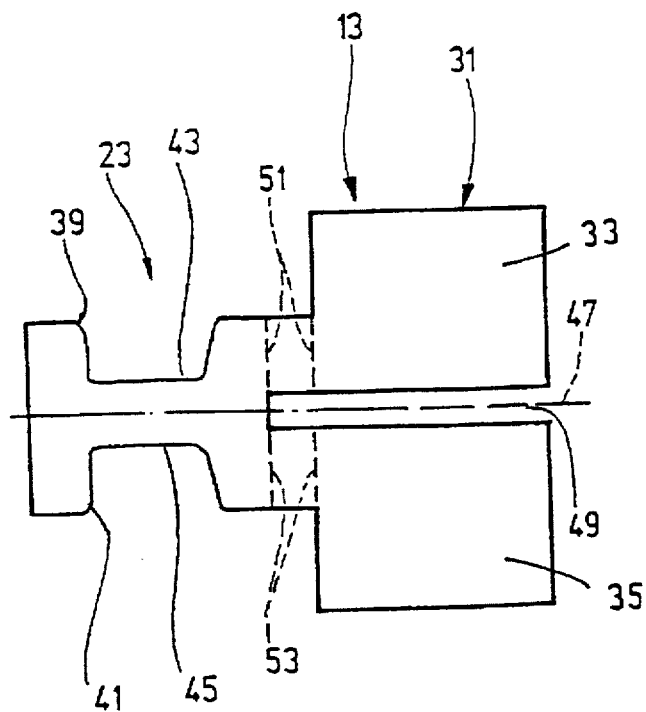
FIG. 3A is a top view of an alternative embodiment of the drive element shown in FIG. 3.

The development of the drive element 13 can be clearly noted from the top view shown in FIG. 3, which shows the coupling section 23 and the wing section 31. The coupling section 23 is developed substantially in a rectangular shape. The longitudinal edges 39 and 41 which extend substantially parallel, may have a variable distance from each other, as seen over the length of the coupling section. Therefore, the width of the coupling section 23 may vary. As shown in FIG. 3A, the coupling section 23 may have concavely developed longitudinal edge regions 43 and 45 at its center, so that the strength of the coupling section 23 will differ over its length.

Such a development of the coupling section enables its elasticity to be adapted to desired operating conditions of the vacuum pump 1. Peak torques and rotary oscillations which produce pressure pulsations in the operation of the pump can therefore be particularly well avoided by suitable control over the elasticity of the drive element 13.

The elastic properties of the drive element 13 may be further varied not only by the variable width of the coupling section 23 but also by the depth of the slot recess 29 in from the end 27. The longer is the free standing region of the coupling section 23, the more flexible is this region of the drive element.

In order to control the flexibility and elasticity of the drive element 13, it is also possible to develop the coupling section 23 in an undulated shape, at least in the freely protruding region which extends beyond the end surface 27 and/or the region arranged in the slot recess 29. Furthermore, the coupling section 23 may include incisions which extend transverse to the center axis 47 or lengthwise thereto so that oscillations of drive torque or rotation can be intercepted more gently.

FIGS. 3 and 3A shows that the wing section 31 has two symmetrically developed wing regions 33 and 35, each of which is arranged symmetrically to the center axis 47, and axis 47 coincides with the axis of rotation 25 of the rotor 7. Each wing region 33 and 35 is itself in two wing parts that are separated from each other by an elongated slot 49 which extends over the entire axial length of each wing region 33 and 35 and protrudes somewhat into the coupling section 23. This design makes it possible, as indicated by the dashed lines 51 and 53, to swing the parts of the wing regions 33 and 35 out of planes parallel to the plane K of the coupling section 23. For example, the wing region 33 is bent downward with respect to the coupling section 23 while the wing region 35 is bent upward with respect to the coupling section 23. Both wing regions 33 and 35 then extend parallel to and spaced apart from each other and are arranged in the respective planes F1 and F2 in the center of which extends the plane K of the coupling section 23.

The drive element 13 is made of resilient material, preferably metal. It can be produced in a simple manner, e.g., by a stamping process, so that the cost of its manufacture is minimal.

Corresponding to the larger outside diameter of the second section 17 of the rotor 7, the total width of the wing section 31 is greater than the width of the coupling section 23. The length and width of the different regions of the drive element 13 are adapted to the dimensions of the rotor 7.

Because the drive element 13 can transmit torque from the coupling to the rotor wing 21, the half bodies 9 and 11 can in practice also be referred to as auxiliary bodies. On the one hand, they support the rotor 7 in the flange 3 of the vacuum pump 1 and, on the other hand, they hold the wing 21 in the housing 5 and place it in rotation. In this connection, the side surfaces of the slot 19 must rest against the side walls of the wing 21 to assure a radial seal here and to assure that the two pump chambers formed within the housing 5 are separated from each other.

Because the drive element 13 includes one end engaging a coupling and the other end resting with the wing 31, moments of rotation can be reliably transmitted. The top view of FIG. 3 also shows that the regions provided with the curved lines 51 and 53 serve as spring elements and elastically and resiliently take up the drive forces and the pressure blows. It is possible to vary the width of the regions 51 and 53 in order to adapt the spring properties of the drive element 13 to given operating conditions of the vacuum pump 1.

The drive element 13 engages into a slot in a coupling (not shown here) which is preferably produced by a sintering process. To provide sufficient tool strength upon producing that coupling, that slot preferably has a width of at least about 6 mm. Since the drive element 13 is preferably stamped out of a sheet metal part, the thickness of the coupling section 23 which engages into the slot in the coupling is less than 6 mm.

In order to assure the transmission of torque between the coupling and the coupling section 23, the coupling section 23 may be of a special development, such as those shown in FIGS. 4 to 7.

Figure 4:
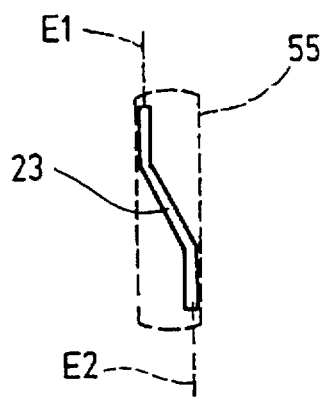
FIGS. 4 to 7 show different embodiments of drive elements.

In FIG. 4, the coupling section 23 can be so shaped that its edge regions are arranged in different planes E1 and E2. The distance between the two planes E2 and E1 is preferably somewhat greater than the height of the slot 55 into the coupling which is indicated by a dashed line. The coupling defining the slot 35 is not shown. But its rotation rotates the drive element and the rotor. The coupling section 23 can be pressed together somewhat upon insertion into the slot 55. As a result of the resilient properties of the material of the drive element, this holds the drive element 13 free of play in the coupling.

Figure 5:
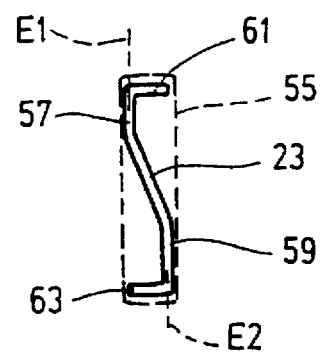

The coupling section embodiment 23 shown in FIG. 5 corresponds to that shown in FIG. 4. Note that in FIG. 5, the edge regions 57 and 59 of the coupling section 23, which are arranged in the planes E1 and E2, are bent off at a right angles. The lengths of the bent sections 61 and 63 correspond essentially to the height of the slot 55. This coupling section 23 enables the thickness of material, which is slightly less than the height of the slot 55 of the coupling, to also be held free of play in the coupling.

Figure 6:
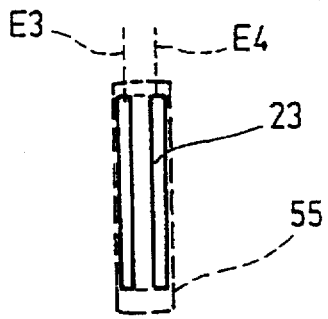
Figure 7:
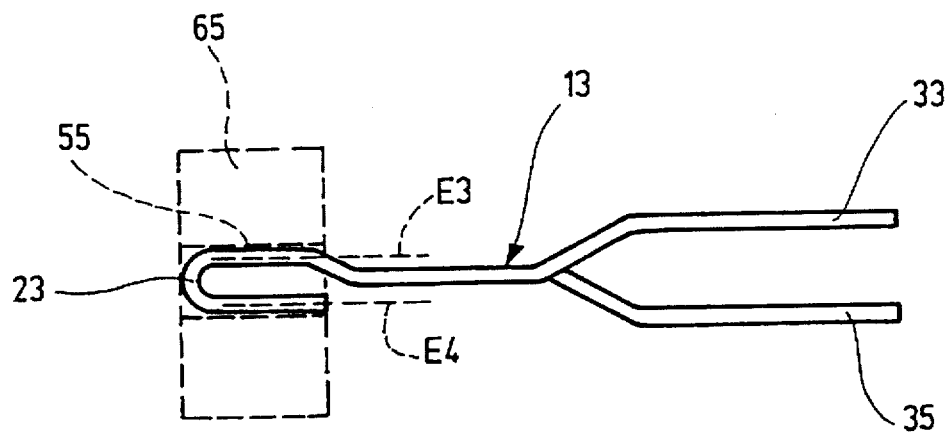

Another coupling section embodiment 23 is shown in FIGS. 6 and 7. This coupling section is bent into a U-shape, wherein the bend line extending perpendicular to the center axis 47 shown in FIG. 3. The two arm sections of the U-shaped region of the coupling section 23 lie in the respective planes E3 and E4. The distance between those planes is again selected so that the U-shaped region of the coupling section 23 is arranged free of play, and preferably under a certain initial stress, within the slot 55 of the coupling.

FIG. 7 shows the bent region of the coupling section 23 in side view. The drive element 13 is in this case shown in a position that corresponds to that shown in FIG. 2. The wing regions 33 and 35 of the drive element 13 are recognizable here. In FIG. 7, the coupling 65 and edge slot 55 are indicated in dashed line.

The illustrated developments of the coupling section 23 have been shown here only for example. It is also possible to provide the edge regions of the coupling section 23 with wing sections which are bent inward in the direction toward the center axis 47 so that regions of material are present here which, as explained with reference to FIGS. 4 to 7, lie in planes which are at a distance apart from each other which corresponds to the width of the slot 55.

In any event, this assures that the drive element 13 can be produced from a relatively thin metal sheet and can nevertheless find dependable support in a slot 55 in a coupling. The width of the slot, based on a special method of manufacture, namely because of the sintering process, cannot be less than a certain minimum amount. Nevertheless, the drive element 13 is in all cases coupled free of play with the coupling so that the above described advantages are obtained.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vacuum pump, comprising:

a pump housing;

a rotor in the housing and having a rotary axis, the rotor being drivable from a coupling to rotate;

a rotor wing in the housing engaged by the rotor for being rotated by the rotor within the housing; and an elastic, deformable, resilient drive element connected with the rotor and connectable with the coupling, for damping torque peaks and rotational oscillations, said drive element being operatively associated with the rotor wing for transmitting a drive moment from the coupling directly to the rotor wing, such that rotation of the drive element rotates the rotor wing and rotates the rotor.

2. The vacuum pump of claim 1, wherein the drive element has a lengthwise direction of extension generally along the direction of the rotor axis.

3. The vacuum pump of claim 1, wherein the rotor wing driven by the rotor is in the housing, spaced a distance through the housing and along the axis of the rotor from the coupling.

4. A vacuum pump, comprising:

a pump housing;

a rotor in the housing and having a rotary axis, the rotor being drivable from a coupling to rotate;

a rotor wing in the housing engaged by the rotor for being rotated by the rotor within the housing, said rotor wing being spaced a distance through the housing and along the axis of the rotor from the coupling; and an elastic, deformable, resilient drive element connected with the rotor and connectable with the coupling for damping torque peaks and rotational oscillations, said drive element having a lengthwise direction of extension generally along the direction of the rotor axis, and said drive element being for transmitting a drive moment from the coupling directly to the rotor wing, such that rotation of the drive element rotates the rotor wing and rotates the rotor.

5. The vacuum pump of claim 4, wherein the drive element is developed in a single piece.

6. The vacuum pump of claim 5, wherein the drive element is a stamped metal part.

7. The vacuum pump of claim 4, wherein the drive element includes a coupling section along the lengthwise direction thereof and which is relatively more flexible than other parts of the drive element for oscillation damping purposes.

8. The vacuum pump of claim 7, wherein the drive element is a stamped part; and the coupling section of the drive element is substantially rectangular in shape as viewed from the top side thereof.

9. The vacuum pump of claim 7, wherein the coupling section of the drive element is of variable width over its length, including a narrow more flexible region and a wider region.

10. The vacuum pump of claim 9, wherein the drive element is a stamped part; the coupling section of the drive element is substantially rectangular in shape as viewed from the top side thereof;

the coupling section having longitudinal edges and having concave regions defined in the longitudinal edges making the coupling section there narrower.

11. The vacuum pump of claim 7, wherein the drive element further comprises a wing section positioned in the rotor for engaging the rotor wing.

12. The vacuum pump of claim 11, wherein the wing section of the drive element is developed as two wing regions each of which projects laterally of the drive element and beyond the longitudinal edges of the coupling section of the drive element.

13. The vacuum pump of claim 12, wherein each wing region is comprised of two wing parts which are separated from each other in a lateral direction by a slot between them.

14. The vacuum pump of claim 13, wherein the wing parts are symmetric in shape and in position with respect to the slot between them.

15. The vacuum pump of claim 12, wherein the wing section of the drive element has first and second wing regions thereof which are offset respectively above and below the coupling section of the drive section, are spaced from each other and are generally parallel.

16. The vacuum pump of claim 15, wherein the coupling section at least toward the wing section is generally in a first plane and the first and second wing regions are in respective second and third planes offset above and below the first plane, and all three planes are generally parallel.

17. The vacuum pump of claim 16, wherein the first plane of the coupling section is approximately the center between the second and third planes of the wing regions.

18. The vacuum pump of claim 15, wherein the wing section of the drive elements is wider across the rotor than the coupling section thereof.

19. The vacuum pump of claim 15, wherein the drive element has a center axis and the coupling section is symmetric to the center axis.

20. The vacuum pump of claim 15, wherein each wing region is comprised of two wing parts which are separated from each other in a lateral direction by a slot between them.

21. The vacuum pump of claim 20, wherein an extension of the axis of symmetry of the coupling section coincides with the slot between the lateral wing regions.

22. The vacuum pump of claim 12, wherein the rotor is developed in at least two parts.

23. The vacuum pump of claim 12, wherein the rotor is comprised of two half bodies with a parting region between them; the drive element being arranged in the parting region between the half bodies of the rotor.

24. The vacuum pump of claim 22, wherein the rotor has a slot recessed in the rotor from the end thereof away from the rotor wing and in the region of the coupling section of the drive element and the slot defining an open area for the drive element which is thicker than the thickness of the coupling section of the drive element passing therethrough; the rotor being shaped for engaging the drive element inward of the end of the rotor and beyond the slot.

25. The vacuum pump of claim 18, wherein the rotor has a slot recessed in the rotor from the end thereof away from the rotor wing and in the region of the coupling section of the drive element and the slot defining an open area for the drive element which is thicker than the thickness of the coupling section of the drive element passing therethrough; the rotor being shaped for engaging the drive element inward of the end of the rotor and beyond the slot.

26. The vacuum pump of claim 24, wherein the rotor has a second slot at the side thereof away from the coupling section of the drive element, the second slot being shaped for receiving the rotor wing at the region of the wing section of the drive element.

27. The vacuum pump of claim 11, wherein the rotor has a slot at the side thereof away from the coupling section of the drive element, the slot being shaped for receiving the rotor wing at the region of the wing section of the drive element.

28. The vacuum pump of claim 27, wherein the slot in the rotor for receiving the rotor wing is defined at least in a region thereof by the wing section of the drive element.

29. The vacuum pump of claim 15, wherein the parallel wing regions of the drive element define a slot between them in which the rotor wing is received.

30. The vacuum pump of claim 23, further comprising means for holding the half bodies of the rotor firmly attached to each other and for holding the drive element fast between the rotor half bodies.

31. The vacuum pump of claim 11, wherein the rotor is comprised of a material selected from the group consisting of plastic, metal and sintered material.

32. The vacuum pump of claim 1, wherein the drive element is developed in a single piece.

33. The vacuum pump of claim 32, wherein the drive element is a stamped metal part.

34. The vacuum pump of claim 2, wherein the drive element includes a coupling section along the lengthwise direction thereof and which is relatively more flexible than other parts of the drive element for oscillation damping purposes.

35. The vacuum pump of claim 34, wherein the drive element is a stamped part; and the coupling section of the drive element is substantially rectangular in shape as viewed from the top side thereof.

36. The vacuum pump of claim 34, wherein the coupling section of the drive element is of variable width over its length, including a narrow more flexible region and a wider region.

37. The vacuum pump of claim 36, wherein the drive element is a stamped part; the coupling section of the drive element is substantially rectangular in shape as viewed from the top side thereof;

the coupling section having longitudinal edges and having concave regions defined in the longitudinal edges making the coupling section there narrower.

38. The vacuum pump of claim 34, wherein the drive element further comprises a wing section positioned in the rotor for engaging the rotor wing.

39. The vacuum pump of claim 38, wherein the wing section of the drive element is developed as two wing regions each of which projects laterally of the drive element and beyond the longitudinal edges of the coupling section of the drive element.

40. The vacuum pump of claim 39, wherein each wing region is comprised of two wing parts which are separated from each other in a lateral direction by a slot between them.

41. The vacuum pump of claim 40, wherein the wing parts are symmetric in shape and in position with respect to the slot between them.

42. The vacuum pump of claim 39, wherein the wing section of the drive element has first and second wing regions thereof which are offset respectively above and below the coupling section of the drive section, are spaced from each other and are generally parallel.

43. The vacuum pump of claim 42, wherein the coupling section at least toward the wing section is generally in a first plane and the first and second wing regions are in respective second and third planes offset above and below the first plane, and all three planes are generally parallel.

44. The vacuum pump of claim 43, wherein the first plane of the coupling section is approximately the center between the second and third planes of the wing regions.

45. The vacuum pump of claim 42, wherein the wing section of the drive elements is wider across the rotor than the coupling section thereof.

46. The vacuum pump of claim 42, wherein the drive element has a center axis and the coupling section is symmetric to the center axis.

47. The vacuum pump of claim 42, wherein each wing region is comprised of two wing parts which are separated from each other in a lateral direction by a slot between them.

48. The vacuum pump of claim 47, wherein an extension of the axis of symmetry of the coupling section coincides with the slot between the lateral wing regions.

49. The vacuum pump of claim 39, wherein the rotor is developed in at least two parts.

50. The vacuum pump of claim 39, wherein the rotor is comprised of two half bodies with a parting region between them; the drive element being arranged in the parting region between the half bodies of the rotor.

51. The vacuum pump of claim 49, wherein the rotor has a slot recessed in the rotor from the end thereof away from the rotor wing and in the region of the coupling section of the drive element and the slot defining an open area for the drive element which is thicker than the thickness of the coupling section of the drive element passing therethrough; the rotor being shaped for engaging the drive element inward of the end of the rotor and beyond the slot.

52. The vacuum pump of claim 45, wherein the rotor has a slot recessed in the rotor from the end thereof away from the rotor wing and in the region of the coupling section of the drive element and the slot defining an open area for the drive element which is thicker than the thickness of the coupling section of the drive element passing therethrough; the rotor being shaped for engaging the drive element inward of the end of the rotor and beyond the slot.

53. The vacuum pump of claim 51, wherein the rotor has a second slot at the side thereof away from the coupling section of the drive element, the second slot being shaped for receiving the rotor wing at the region of the wing section of the drive element.

54. The vacuum pump of claim 38, wherein the rotor has a slot at the side thereof away from the coupling section of the drive element, the slot being shaped for receiving the rotor wing at the region of the wing section of the drive element.

55. The vacuum pump of claim 54, wherein the slot in the rotor for receiving the rotor wing is defined at least in a region thereof by the wing section of the drive element.

56. The vacuum pump of claim 42, wherein the parallel wing regions of the drive element define a slot between them in which the rotor wing is received.

57. The vacuum pump of claim 50, further comprising means for holding the half bodies of the rotor firmly attached to each other and for holding the drive element fast between the rotor half bodies.

58. The vacuum pump of claim 38, wherein the rotor is comprised of a material selected from the group consisting of plastic, metal and sintered material.

* * * * *